(12) United States Patent
Clow et al.

(10) Patent No.: US 8,479,112 B2
(45) Date of Patent: Jul. 2, 2013

(54) MULTIPLE INPUT LANGUAGE SELECTION

(75) Inventors: Joshua Clow, Bellevue, WA (US);
Ravipal Soin, Sammamish, WA (US);
Robert A. Dain, Redmond, WA (US);
Michael S. Kaplan, Redmond, WA (US); Wei Wu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 3343 days.

(21) Appl. No.: 10/436,232

(22) Filed: May 13, 2003

(65) Prior Publication Data

US 2004/0230912 A1    Nov. 18, 2004

(51) Int. Cl.
*G06F 3/048* (2006.01)

(52) U.S. Cl.
USPC ........... 715/773; 715/202; 715/236; 345/171; 345/173

(58) Field of Classification Search
USPC .. 715/533, 535, 703, 760, 202, 236; 345/171, 345/176
See application file for complete search history.

(56) References Cited

U.S. PATENT DOCUMENTS

| | | | | |
|---|---|---|---|---|
| 6,154,758 | A * | 11/2000 | Chiang | 715/541 |
| 6,182,099 | B1 * | 1/2001 | Nakasato | 715/236 |
| 6,307,541 | B1 * | 10/2001 | Ho et al. | 345/171 |
| 6,562,078 | B1 * | 5/2003 | Yang et al. | 715/202 |
| 6,801,190 | B1 * | 10/2004 | Robinson et al. | 345/173 |
| 6,809,725 | B1 * | 10/2004 | Zhang | 345/171 |
| 7,168,046 | B2 * | 1/2007 | Kang et al. | 715/773 |
| 7,257,528 | B1 * | 8/2007 | Ritchie et al. | 704/7 |
| 7,277,088 | B2 * | 10/2007 | Robinson et al. | 345/173 |
| 2003/0112277 | A1 * | 6/2003 | Shteyn | 345/773 |

OTHER PUBLICATIONS

Type & Learn Japanese printout from website.
ExpLAN Computers, Ltd.—Solo Input device options printout from website.
I. Scott MacKenzie et al., "The Design and Evaluation of a High-Performance Soft Keyboard", Dept. Computing and Information Science, University of Guelph, pp. 1-12.
Mathias Kölsch et al., "Keyboards without Keyboards: A Survey of Virtual Keyboards".
Windows® CE, The Personal Pocket Dictionary Series printout from website.

* cited by examiner

*Primary Examiner* — Doon Chow
*Assistant Examiner* — Linh K Pham
(74) *Attorney, Agent, or Firm* — Shook Hardy & Bacon LLP

(57) ABSTRACT

Multiple language inputs may be provided to various applications programs and/or threads in a computer system. Such inputs may be directed to various software systems on the computer for further processing, wherein the software systems provide language-specific processing. Each application program and/or thread within an application program active on or accessible by the computer may have a different selected input language. More specifically, systems, methods, and computer-readable media for this process may include: (a) determining an input language for a first application program accepting input through a computer; and (b) selecting at least one software system capable of accepting or operating on at least some of the input based, at least in part, on the input language determined for the first application program. The software system(s) may include at least one member selected from the group of: a soft keyboard generator, a handwriting recognizer, and a speech recognizer. In some examples, the input language of various software systems on the computer may be tied to the input language of another software system, such as the soft keyboard. For example, in some instances, a specific handwriting recognizer and/or a specific speech recognizer may be selected for receiving input based, at least in part, on the input language determined for the soft keyboard used in the application program.

10 Claims, 8 Drawing Sheets she# MULTIPLE INPUT LANGUAGE SELECTION

FIELD OF THE INVENTION

This invention generally relates to systems, methods, and computer-readable media for allowing multiple language input to various applications programs and/or threads active on a computer system. Such input maybe directed to various software systems on and/or accessible by the computer for further processing, wherein the software systems provide language-specific processing. The software systems may include, for example, software for providing soft keyboards, handwriting recognizers, speech recognizers, and the like.

BACKGROUND

In recent years, computing systems have become dramatically faster, smaller, less expensive, and more powerful, such that computing systems have become an integral part of many well known and commonly used devices. People commonly use computers in their daily life, for example, in the form of personal desktop computers, laptops, palmtops, personal digital assistants, telephones, television set top boxes, and many other common devices. Recent improvements in the computer field, however, are not limited to improvements in computer hardware. Rather, computer software is more versatile and flexible then ever, allowing seamless interaction between many different computing systems, formats, and protocols.

Input for modern computer systems is not limited to the use of the well-known and conventional mouse and physical keyboard input devices. Rather, in addition to a keyboard and mouse, many of today's computers allow input in a variety of additional ways, including through electronic ink (via a pen or stylus-based computer or "tablet PC") and speech recognition. Moreover, a wide variety of computing devices (such as PDAs, stylus-based computers, etc.) do not require a physical keyboard, but rather, they allow user input through a "soft keyboard" that appears on screen and through which a user can input information using an appropriate user input device (such as a stylus, a mouse, or the like).

Many computer users are bilingual, and in at least some instances, such users may wish to input data into their computer (e.g., via typing, handwriting, or speaking) in a language other than the language they typically use. For example, employees of multinational corporations may receive email and/or other documents from their colleagues or customers located in a variety of different countries. In some instances, the receiver may wish to respond in the language of the person sending the information. Modern computing systems do not provide an easy way of allowing users to temporarily change an input language for an application program and/or a particular thread in an application program while enabling users to take advantage of various tools at the user's disposal for use in the newly selected language, such as a soft keyboard layout, a handwriting recognizer, and/or a speech recognizer corresponding to the newly selected language.

SUMMARY

Aspects of the present invention generally relate to systems, methods, and computer-readable media for allowing multiple language input to various applications programs and/or threads on and/or accessible through a computer system. Such input may be directed to various software systems on and/or accessible through the computer for further processing, wherein the software systems provide language-specific processing. Each application program and/or thread within an application program active on or accessible through the computer may have a different selected input language. More specifically, aspects of this invention relate to systems, methods, and computer-readable media that include: (a) determining an input language for a first application program accepting input through a computer; and (b) selecting at least one software system capable of accepting or operating on at least some of the input based, at least in part, on the input language determined for the first application program. The software system(s) may include at least one member selected from the group of: software for generating a soft keyboard, a handwriting recognizer, and a speech recognizer. Some even more specific example aspects of the invention relate to rendering a soft keyboard on a computer screen for providing input. Other more specific aspects of some examples of the invention tie the input language of other software systems to the input language selected for a soft keyboard. For example, in some systems and methods according to the invention, a specific handwriting recognizer and/or a specific speech recognizer may be selected for receiving input based, at least in part, on the input language determined for the soft keyboard used in the first application program.

BRIEF DESCRIPTION OF THE DRAWINGS

The foregoing summary of aspects of the invention, as well as the following detailed description of various examples is better understood when read in conjunction with the accompanying drawings, which are included by way of example, and not by way of limitation with regard to the claimed invention. In the figures:

DETAILED DESCRIPTION OF THE DRAWINGS

Figure 1:
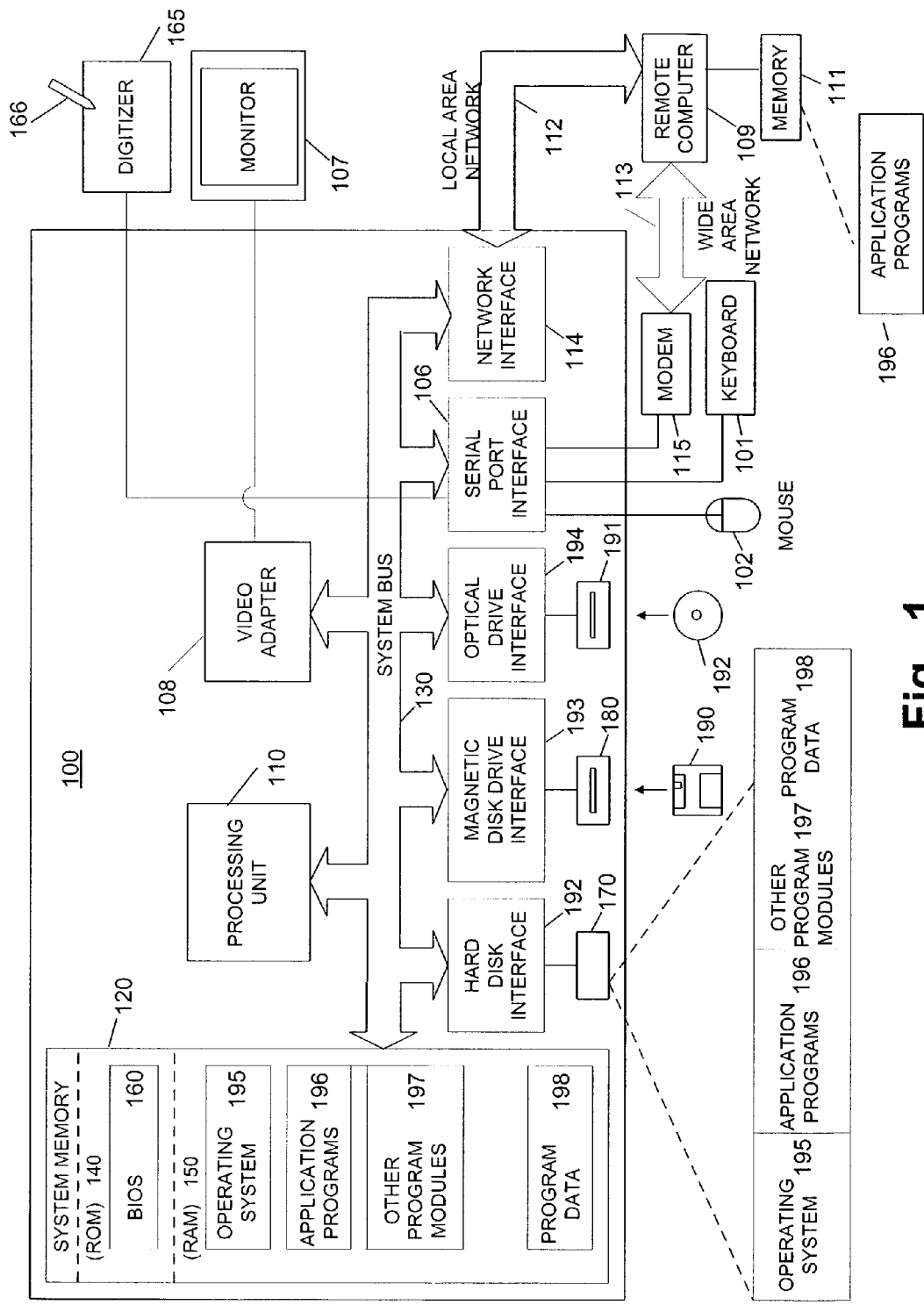
FIG. 1 shows a general-purpose computer that may be used in accordance with one or more aspects of the present invention.

Various specific examples of the invention are described in detail below in conjunction with the attached drawings. To assist the reader, this specification is broken into various subsections, as follows: Terms; General Description of Multiple Language Input Selection According to the Invention; Example Hardware Useful with the Invention; Specific Examples of the Invention; and Conclusion.

A. Terms

The following terms are used in this specification, and unless otherwise noted or clear from the context, these terms have the meanings provided below.

Application Program: Any data entry, update, query or report that accepts input from a source and processes data for the user. Application programs include conventional, commercially available software as well as custom and/or packaged programs for predetermined uses, such as payroll, billing, inventory, accounting, and the like. Examples of application programs include, but are not limited to: word processing programs, spreadsheets, drawing programs, electronic ink programs, web browsers, document management programs, email programs, financial management programs, and the like.

User Interface: Display screens and/or other audio and/or visual information presented to a party to enable use of and/or interaction with an application program.

Input Language: The language in which input is entered into a computer system, whether typed, handwritten, spoken, downloaded from a source, or input in another manner. In at least some examples of the invention, users may select different input languages to be applied in a specific application program and/or to a thread within an application program.

Thread: Related data or information within one or more application programs. A single application program may have one or more active "threads" at any given time. Examples of "threads" include, but are not limited to: individual documents and/or related sets of documents open in a word processing or ink entry program; individual spreadsheets and/or related sets of spreadsheets open in a spreadsheet application program; an individual email message, optionally including all associated replies, forwarded messages, parent messages, etc; individual drawings and/or related sets of drawings open in a drawing application program; individual documents and/or sets of documents existing in a document management program; and the like.

Render or Rendered or Rendering: The process of determining how information (including text, graphics, and/or electronic ink) is to be displayed, whether on a screen, printed, or output in some other manner.

Computer-Readable Medium: Any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules, or other data. "Computer storage media" includes, but is not limited to: RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

B. General Description of Multiple Language Input Selection According to the Invention In general, this invention relates to systems, methods, and computer-readable media for allowing multiple language input to various applications programs and/or threads on and/or accessible through a computer system. Such input may be directed to various software systems on the computer for further processing, wherein the software systems provide language-specific processing.

Some more specific aspects of this invention relate to methods that include: (a) determining an input language for a first application program accepting input through a computer; and (b) selecting at least one software system capable of accepting or operating on at least some of the input based, at least in part, on the input language determined for the first application program. The software system(s) may include at least one member selected from the group of: software for generating a soft keyboard, a handwriting recognizer, and a speech recognizer. When the input language for the first application program is changed to a second input language, in at least some examples of these aspects of the invention, at least one software system then maybe selected based, at least in part, on the second input language. Also, in at least some examples of these aspects of the invention, changing the input language for the first application program does not affect a language in which a user interface for the first application program is rendered.

In some examples of methods according to the invention, users may switch from the first application program to a second application program. In that instance, in at least some examples, a new input language for the second application program may be set by the user and determined by the system. When a new input language for the second application program is selected, at least one software system capable of accepting or operating on at least some of the input in the second application program maybe selected based, at least in part, on the input language for the second application program. Changing the input language and/or software systems in this manner will not, in at least some examples of the invention, affect a language in which a user interface for the first and/or second application program is rendered.

In a similar manner, in some examples of the invention, users may switch from a first thread in the first application program to a second thread in that same application program. Changing the input language and/or the software systems in this manner does not affect a language in which a user interface for the first application program is rendered, in at least some examples of the invention.

Additional, more specific aspects of this invention relate to methods that include: (a) determining an input language for a first application program accepting input through a computer; and (b) rendering a soft keyboard on a display of the computer, wherein the soft keyboard is configured based, at least in part, on the input language determined for the first application program. The soft keyboard may be rendered on the display, in at least some examples of these aspects of the invention, in response to a user's command or request. The soft keyboard may be changed by changing the input language for the application program and/or thread.

Additional examples of these aspects of the invention may allow switching from the first application program to a different, second application program and/or between different threads within an application program. In some examples, when this switching occurs, an input language for the second application program or the second thread may be determined, and when the input language differs from that of the first application program or thread, a new soft keyboard maybe rendered on the display of the computer, wherein the new soft keyboard is configured based, at least in part, on the new input language. Again, rendering the new soft keyboard, in at least some examples of this invention, will not affect a language in which a user interface for the first application program or the second application program is rendered.

Aspects of this invention also relate to various systems and computer-readable media for performing various methods including those described above. Systems in accordance with these aspects of the invention may include, for example, input devices or systems for selecting the input language(s) for the application programs and processors for selecting the proper software system(s) and/or for rendering the soft keyboards. Additionally, systems in accordance with these aspects of the invention may include selector(s) that allow the user to switch from one application program to another and/or between different threads in an application program.

Additional aspects of the invention relate to the manner in which systems and methods according to some examples of the invention determine which soft keyboard to render on a computer display, particularly when two or more keyboard layouts share a common keyboard identifier. In such instances, systems and methods according to some examples of the invention may select a soft keyboard layout that corresponds to a physical keyboard and/or physical keyboard driver previously used on the computer for the determined input language. If more than one physical keyboard or keyboard driver has been used on the computer for the input language, a soft keyboard layout corresponding to the most recently used physical keyboard or keyboard driver or the most commonly used physical keyboard or keyboard driver on the computer may be selected and rendered. As another alternative, systems and methods according to examples of the invention may ask for user input as to which soft keyboard layout is preferred.

Some aspects of the invention also may tie the input language of other software systems to the input language selected for a soft keyboard. For example, in some systems and methods according to the invention, a specific handwriting recognizer and/or a specific speech recognizer may be selected for receiving input based, at least in part, on the input language determined for the first application program and/or the soft keyboard selected. Such selections may occur automatically, by systems and methods according to the invention, and/or through use of user input (e.g., if more than one acceptable speech or handwriting recognizer is available for use with the computer). Systems and methods according to these aspects of the invention also, in at least some instances, may need to determine whether at least one handwriting and/or speech recognizer is available for the input language.

Additional more specific aspects of this invention relate to systems, methods, and computer-readable media that tie language selection for a specific application program to selection and use of an appropriate handwriting recognizer. For example, aspects of this invention relate to systems, methods, and computer-readable media for recognizing electronic ink that include: (a) receiving electronic ink; (b) determining a selected language; (c) setting a recognizer associated with the selected language; (d) sending at least some of the electronic ink to the recognizer; (e) receiving recognized ink from the recognizer; and (f) sending the recognized ink to an application program. In addition, in at least some examples, processes according to these methods may include: sending the electronic ink to the application program; maintaining at least one of the electronic ink and the recognized ink; and/or sending at least some of the electronic ink to a second recognizer.

Still additional aspects of this invention relate to processes for changing between at least two handwriting recognizers. Such processes, in at least some examples of this invention, may include: (a) receiving a change in language; (b) determining if a change in recognizer is associated with the change in language; and (c) switching from a first recognizer to a second recognizer when the second recognizer corresponds to the language of the change and the first recognizer does not correspond to the language of the change. In such examples, upon determining that no recognizer is associated with the language of the change, systems and methods according to examples of the invention may handle the situation in any suitable manner. For example, an appearance of an ink input panel, a soft keyboard, the user interface, the speech recognizer, and/or other software systems may be changed to comport with the language of the change, but the first recognizer may remain designated. As another example, systems and methods according to some examples of the invention may switch to a default handwriting recognizer in this situation. Any other suitable way of handling this situation may be used without departing from the invention.

Examples of this invention may be particularly suitable for use by multi-national corporations that wish to standardize an operating system platform and make marginal changes to support a variety of different languages. More particularly, examples of this invention provide the ability to easily change the input language for handwritten, spoken, and/or soft keyboard text input in an application program or in a thread within an application program. In some examples of the invention, this can be accomplished without affecting an underlying system language and/or an underlying language designated for the user interface in the application program. Aspects of this invention also are useful for multi-national corporations that want to use a single operating system image deployment for all of their worldwide offices to reduce IT maintenance. Such corporations can install the same image across all their global offices and allow users to select the input language to be used, without having to maintain language specific operating system images for offices in different countries.

Various specific examples of the invention will be described in more detail in the sections that follow.

C. Example Hardware Useful with the Invention

FIG. 1 illustrates a schematic diagram of an illustrative example general-purpose digital computing environment that can be used to implement various aspects of the present invention. In FIG. 1, a computer 100 includes a processing unit 110, a system memory 120, and a system bus 130 that couples various system components, including the system memory, to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices, such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but they may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, to a parallel port, to another interface, and to the system bus 130, as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet, using both wired and wireless connections.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, UDP, Ethernet, FTP, HTTP, and the like is presumed, and the system can be operated in a client-server configuration to permit a user to retrieve web pages from a web-based server. Any of various conventional web browsers can be used to display and manipulate data on web pages.

Figure 2:
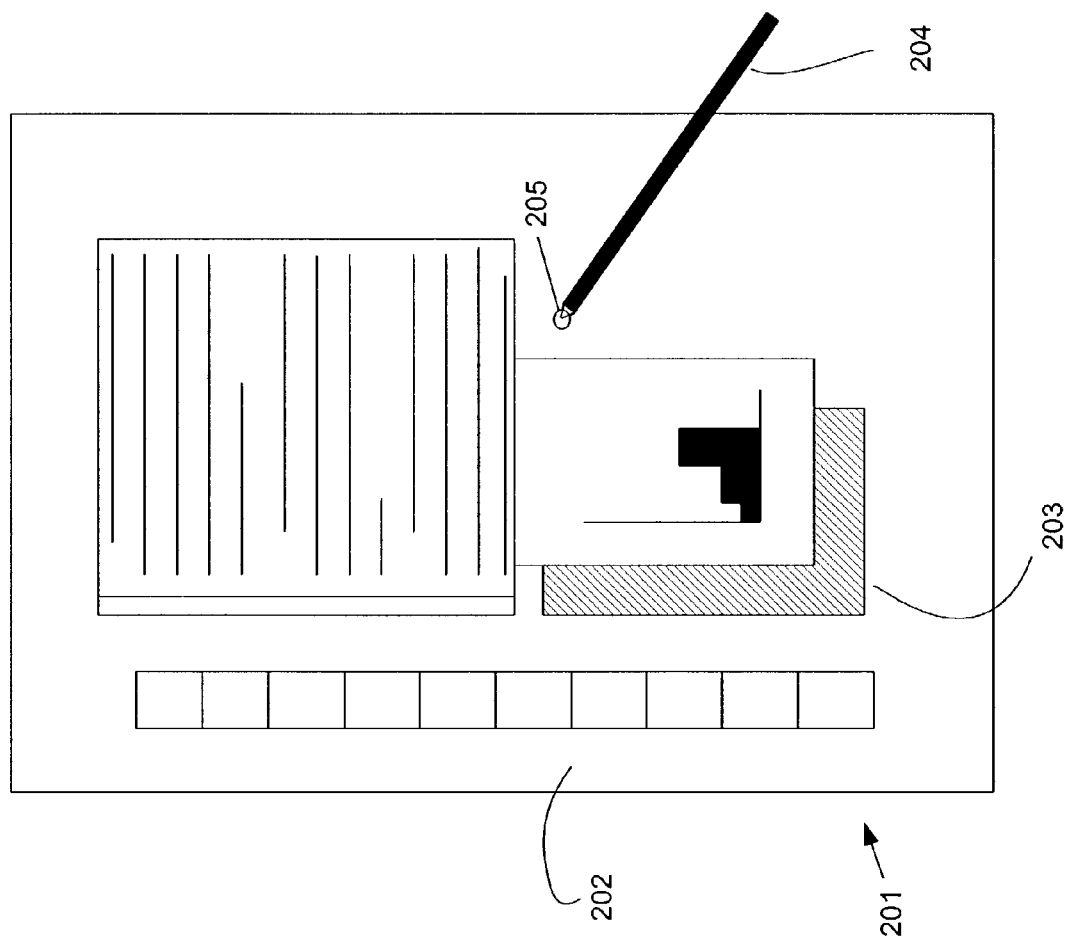
FIG. 2 shows a display for an example stylus-based computing system that maybe used in accordance with aspects of the present invention.

FIG. 2 illustrates an illustrative pen or stylus-based PC 201 (e.g., a tablet PC, PDA, or the like) that can be used in accordance with various aspects of the present invention. Any or all of the features, subsystems, and functions in the system of FIG. 1 can be included in the computer of FIG. 2. Pen or stylus-based PC 201 includes a large display surface 202, e.g., a digitizing flat panel display such as a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as pen digitizers available from Mutoh Co. or Wacom Technology Co. Other types of pen digitizers, e.g., optical digitizers, also may be used. The pen or stylus-based PC 201 interprets gestures made using stylus 204 in order to manipulate data, enter text, create drawings, and/or execute conventional computer application tasks, such as spreadsheets, word processing programs, and the like.

The stylus 204 may be equipped with one or more buttons or other features to augment its capabilities. In one embodiment, the stylus 204 could be implemented as a "pencil" or "pen," in which one end constitutes a writing portion and the other end constitutes an "eraser" end that, when moved across the display, indicates portions of the display to be erased. Other types of input devices, such as a mouse, a trackball, or the like could be used. Additionally, a user's own finger could be the stylus 204 and used for selecting or indicating portions of the displayed image on a touch-sensitive or proximity-sensitive display. Consequently, the term "user input device," as used herein, is intended to have a broad definition and encompasses many variations on well-known input devices, such as stylus 204. Region 205 shows a feedback region or contact region permitting the user to determine where the stylus 204 as contacted the display surface 202.

In various examples, the system provides an ink platform as a set of COM (component object model) services that an application program can use to capture, manipulate, and store ink. The ink platform may also include a mark-up language including a language like the extensible markup language (XML). Further, the system may use DCOM as another implementation. Yet further implementations may be used including the Win32 programming model and the Net programming model from Microsoft Corporation. These platforms are commercially available and known in the art.

D. Specific Examples of the Invention

Figure 3:
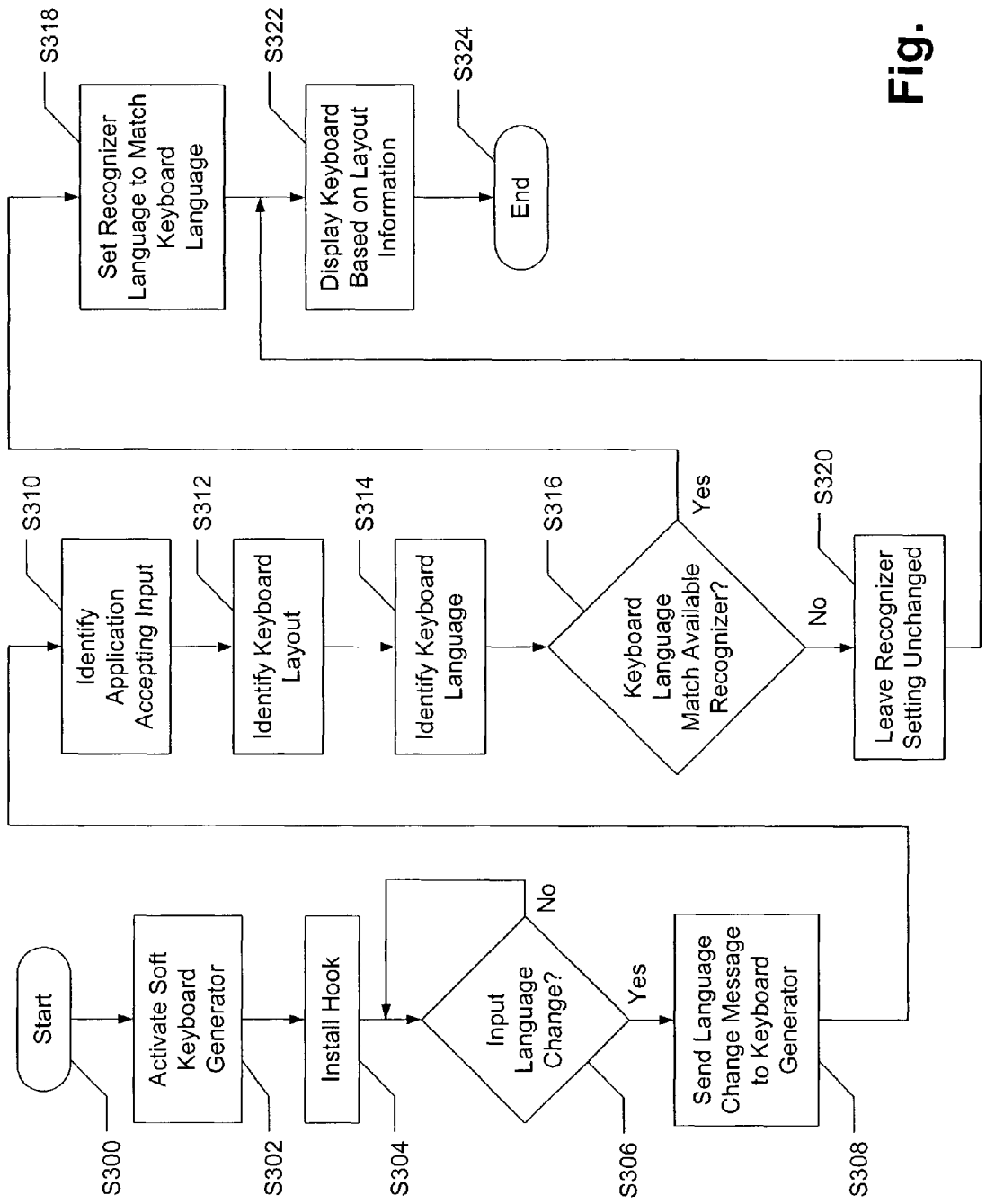
FIG. 3 shows example methods for selecting an input language for an application program, which, in these examples, results in selection of a soft keyboard and a handwriting recognizer.
Figure 4:
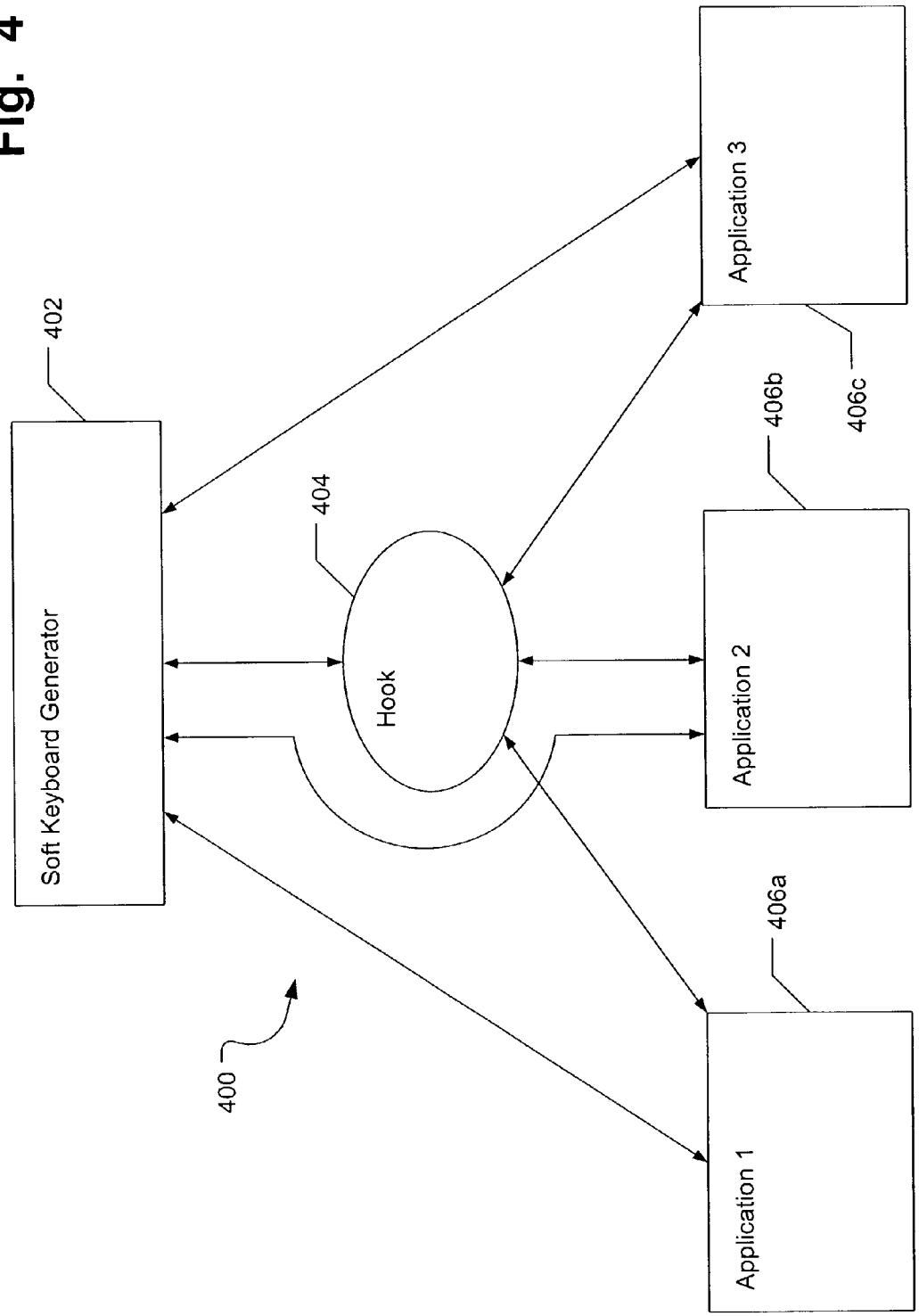
FIG. 4 shows example systems for selecting an input language for an application program that can be used to perform various methods, including the methods described in conjunction with FIG. 3.

FIGS. 3 and 4 generally illustrate example systems and methods that may be used in practicing this invention, e.g., to select and render soft keyboard layouts and/or handwriting and/or speech recognizers based on an input language of an application program. As illustrated in FIG. 3, as the process starts (S300), in an initial step, a soft keyboard generator is activated (S302). This action activates and/or installs appropriate hardware and/or software code (S304) for monitoring the application programs active on the computer system for events indicating a change in the input language (also called a "hook"). Any suitable hardware and/or software can be used for the "hook" without departing from the invention.

In the next step, the system monitors the active application programs for any change in the input language (S306). Changes to the input language may be made by the user or in any other suitable manner without departing from the invention (e.g., by opening a document containing a previously selected language that differs from the default input language, etc.). If no change is noted (Answer "No"), the monitoring process continues, e.g., at regular intervals or at suitable times while applications remain open and active. When the monitoring hardware and/or software notes an input language change (Answer "Yes" at S306), it sends a message to the soft keyboard generator indicating that a language change has been noted (S308).

In response to this message, the soft keyboard generator identifies the application program that is currently accepting input data (e.g., from a user or from any other suitable source) (S310). Then, by looking at the new input language selected or designated for that application program, certain keyboard information is determined for the newly selected or designated input language. For example, as illustrated in FIG. 3, specific keyboard layout information (e.g., conventional keyboard layout codes) may be determined (S312) and a specific keyboard language may be determined (S314).

Then, in some examples of the invention, a handwriting and/or speech recognizer may be selected or designated based on the information used in determining the appropriate language and/or layout for the soft keyboard. As illustrated in FIG. 3, in S316, a determination is made whether the keyboard language determined at S314 matches a language of a handwriting recognizer available for use by the system receiving the input (e.g., stored locally on the computer or accessible through the computer). If Yes, the handwriting and/or speech recognizer for this particular input in this application program will be selected based upon the keyboard language determined as S314 (Step S318). If No, the situation can be handled in any suitable manner without departing from the invention. For example, as illustrated in FIG. 3, the previously designated recognizer setting may be left unchanged (S320). As another example, systems and methods according to some examples of the invention may revert to a default recognizer. As still another example, systems and methods according to some examples of the invention may deactivate handwriting recognition capabilities in this situation. As another example, the system may query the user as to which recognizer (if any) to activate. Any other suitable way of handling this situation, including combinations of the above methods, may be used without departing from the invention.

After the system input language is set at S318 or S320 (or the situation is otherwise appropriately handled), systems and methods according to some examples of the invention may then display the soft keyboard on the computer display using the keyboard layout information determined at S312 (Step S322). This soft keyboard maybe rendered on the computer display, in at least some examples of the invention, in response to a user command, automatically, selectively (e.g., upon the occurrence of certain predetermined events), and/or at any other suitable time, without departing from this invention. The procedure will then end (S324), e.g., and wait for input or other action.

In addition or as an alternative, steps for selecting a speech recognizer based on the input language selected for an application program and/or a soft keyboard may be accomplished in any suitable manner without departing from the invention, including, for example, in the same general manner that the handwriting recognizer is selected as described in conjunction with FIG. 3.

Input may be sent to at least one of the software systems (e.g., soft keyboard, speech recognizer, handwriting recognizer, etc.) in accordance with systems and methods of the invention in any suitable manner or at any suitable time without departing from the invention. For example, input may be sent to the appropriate system automatically, at any time while input is being entered; at intervals while the input is being entered; in response to a user's command; or in any other suitable or desired manner, including in conventional manners known in the art.

Of course, variations in the specific steps described in conjunction with FIG. 3 may be performed without departing from the invention. For example, the specific illustrated steps may be changed to other suitable methods, the order of the steps may be changed, certain steps may be skipped, and/or additional steps may be added to the procedure, without departing from the invention.

FIG. 4 generally illustrates an example of a system 400 that may be used in practicing at least some examples of this invention, including the example methods described above in connection with FIG. 3. As described above, a soft keyboard generator 402 activates and/or installs a hardware and/or software "hook" 404 that monitors the various open and active application programs 406a, 406b, and 406c on the computer. When the hook 404 notes an input language change in an application program (406a, 406b, or 406c), it informs the soft keyboard generator 402, which then looks at the active application programs 406a, 406b, and 406c to determine which is accepting input and the language selected with respect to that input. The specific soft keyboard layout, the handwriting recognizer, and/or the speech recognizer may be selected for that specific application program (and/or a specific thread in an application program) based on the input language selected by the user for that application program (and/or that thread).

Figure 5:
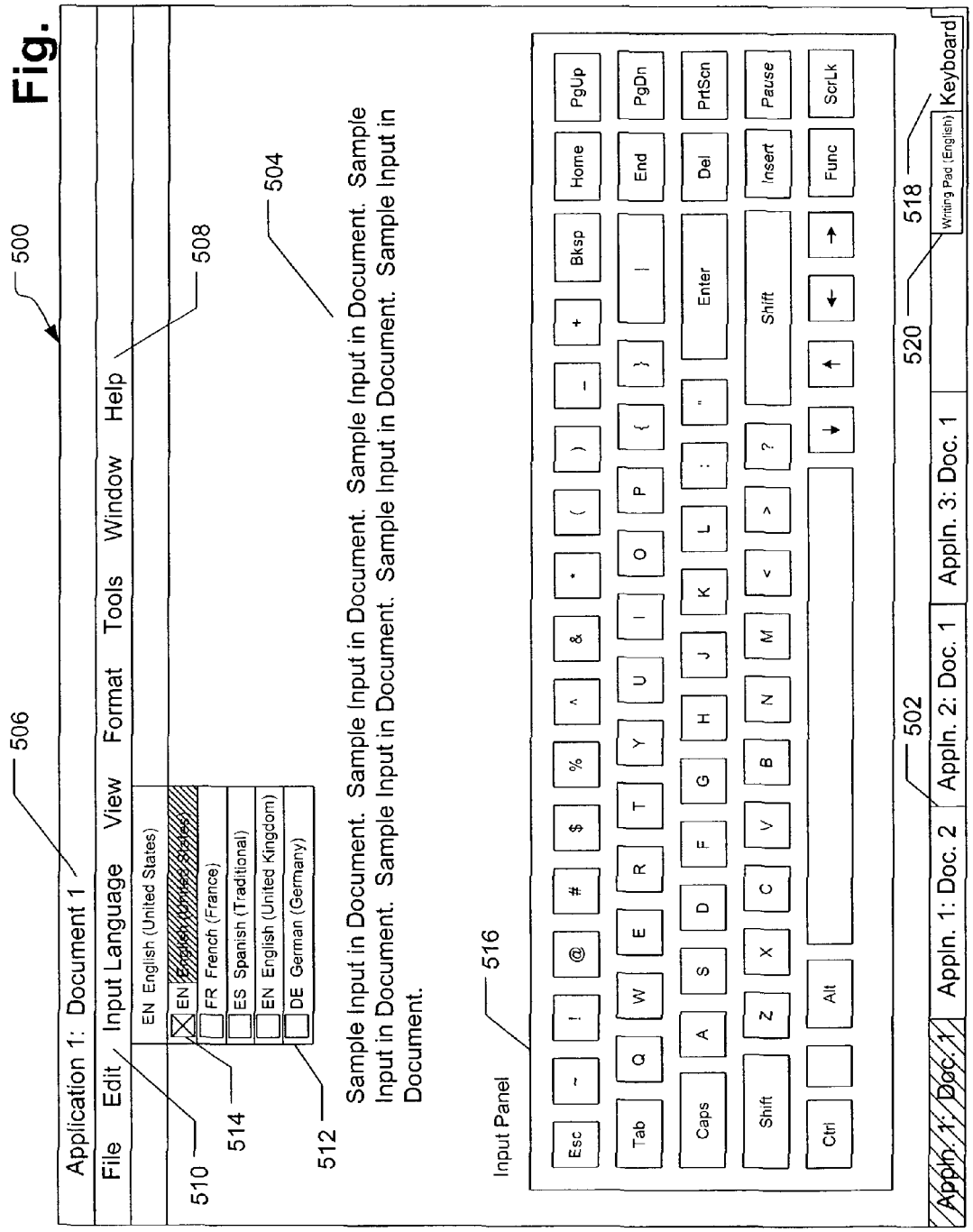
FIGS. 5 and 6 illustrate example changes in a rendered soft keyboard and user interface when changing between a first application program and/or thread having a first input language and a second application program and/or thread having a second input language.
Figure 6:
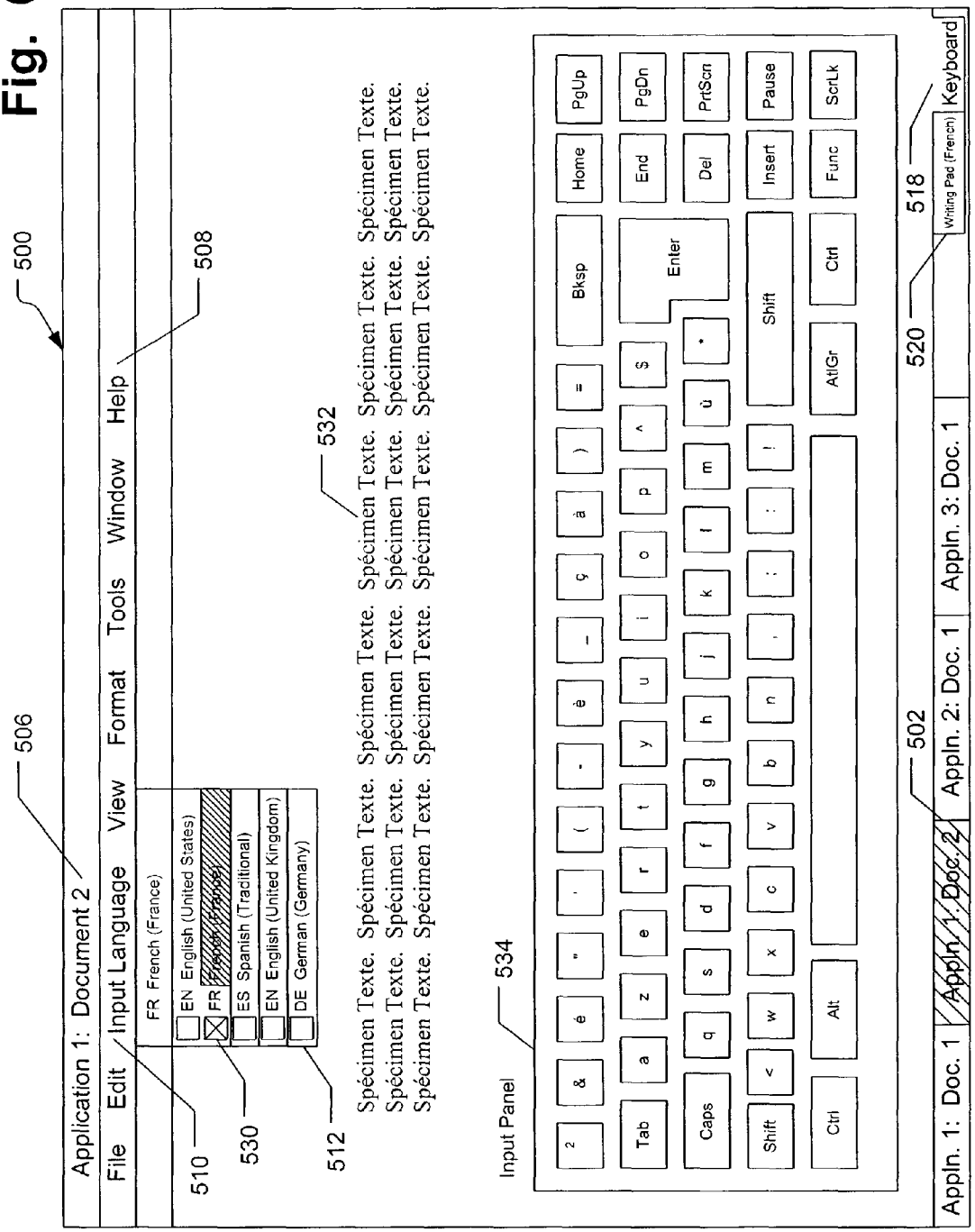

FIGS. 5 and 6 generally illustrate example depictions of user interface displays and the manner in which the display may change in some examples of this invention when the input language in an application program is switched. As shown in FIG. 5, a computer has several application programs active and running, as indicated on computer display 500 by application bar 502. In the illustrated example, the application bar 502 indicates that three application programs are open (Application Program 1, Application Program 2, and Application Program 3). Additionally, as illustrated in the example application bar 502, Application Program 1 has two open "threads," namely, Application 1: Document 1 and Application 1: Document 2. Any number and type of application programs may be open, active, and running at any given time, and each application program may have any number of open threads without departing from this invention.

In the example shown in FIGS. 5 and 6, the overall system language for the computer on which the displays 500 are being generated is preselected by the user (e.g., during initial computer system set up or other appropriate time) as English. Additionally, the application program's user interface language also is preselected as English (e.g., during initial computer system set up, application program installation, or other appropriate time). In the illustrated example of FIG. 5, the computer display 500 is displaying at least a portion of the content 504 of Document 1 in Application 1, as indicated in the document title bar 506. Because of the language selections described above, the title bar 506 itself is rendered in English, and similarly, the toolbar 508, which includes various functions available for use with Application Program 1, also is rendered in English.

An input language selector 510 is one option available from the application program's user interface toolbar 508 in this example system. In this example, when a user activates the input language selector 510, a drop down menu 512 appears, and from this menu 512, the user can select any available input language for this thread (i.e., Document 1 in Application Program 1, in this example). As indicated in the illustrated display 500, in this example, the user has selected U.S. English 514 as the input language for Document 1. Of course, any other way of selecting an input language for an application program and/or a thread within an application program can be used without departing from the invention.

Notably, when U.S. English 514 is selected as the input language 510 for the application program and/or the specific thread within an application program, the soft keyboard (also called an "input panel") 516 appears as a conventional U.S. English language keyboard. In this illustrated example, the keyboard layout of the rendered soft keyboard input panel 516 corresponds to a conventional QWERTY type keyboard layout, although, if desired, the system could be set up to render any desired keyboard layout, including, but not limited to a DVORAK keyboard layout (a DVORAK keyboard has a different conventional layout identifier from the QWERTY keyboard's layout identifier, thus enabling systems and methods according to the invention to distinguish between these layouts and render the desired layout, even though both layouts are used for U.S. English language input).

The physical appearance of input panel 516 (and/or the physical appearance of other user interfaces) also may be called a "user interface surface" in this specification. The input panel 516 user interface surface may change when a different input language and/or a different keyboard layout identifier is/are selected for the specific application program and/or thread within the application program. Any suitable way of selecting a specific keyboard layout may be used without departing from the invention.

The input panel 516 may appear on the display 500 in any suitable manner without departing from the invention. For example, a user of a pen or stylus-based computer system may call up a soft keyboard input panel 516 by tapping a keyboard tab 518 located by the application bar 502. In some examples, a user may be able to toggle between use of a soft keyboard input panel 516 for inputting typed data and a pen for inputting handwritten data, e.g., on a "writing pad," by toggling between different interfaces using keyboard tab 518 and a writing pad tab 520, as shown in FIG. 5.

FIG. 6 illustrates an example of the same computer display 500 when another thread in Application Program 1 is accessed, namely, Document 2 (note the changes in title bar 506 and in the application bar 502 as compared with FIG. 5). In this thread of Application Program 1, the user has selected French as the input language (note the selected language 530 in drop down menu 512 of language selector 510), and the user has entered French language input 532 into the application program.

Notably, selection of French as the input language has changed the appearance of the user interface surface of the input panel 534 to that of a conventional French keyboard layout. More specifically, selecting the French language 530 via language selector 510 changes the language information settings for this thread in the application program (including both a specific language identifier and a keyboard layout identifier) to that for French. Then, when the soft keyboard generator takes steps to generate the soft keyboard (e.g., in response to a user command, such as by tapping keyboard tab 518), the keyboard generator will recognize the keyboard layout identifier for French and generate a soft keyboard corresponding to that layout. As described above in connection with FIG. 5, in this example, a writing pad tab 520 also is included in application bar 502 to allow the user to switch from the input panel 516 user interface surface to a user interface surface that allows handwritten input. While the conventional French keyboard layout of FIG. 6 differs in significant ways from the conventional QWERTY keyboard layout of FIG. 5, use of software to mimic the physical keyboard allows systems and methods according to examples of the invention to easily and quickly change between the different keyboard layout patterns.

As shown in the examples illustrated in FIGS. 5 and 6, the user interface for Application Program 1 (e.g., application bar 502, title bar 506, and toolbar 508) present on the display screen 500 is in English, even though, in FIG. 6, the input into the specific thread in the application program has been selected as French. In at least some examples of the invention, changing the input language of an application program or a thread within an application program does not affect the remaining language settings in the computer system (e.g., does not affect the language settings of the overall computer system and/or the user interface for the application program). Accordingly, as illustrated in FIG. 6, the remainder of the user interface for the application program (e.g., everything other than the soft keyboard) remains in English (its original setting), even though this thread in the application program realizes that it is receiving French language input (and has been set to receive French input). Optionally, as described above, the input language settings for a handwriting recognizer and/or a speech recognizer also may be changed on an application program-by-application program basis and/or on a thread-by-thread basis. In still other examples, changing the input language for a specific thread and/or an application program also may be used to trigger a change in the language of the user interface for that application program and/or thread within the application program. Doing so may be particularly useful, for example, when a speech recognizer input language is changed so that the new input language for the speech recognizer also can be used as the language to control the user interface of the application program (at least for that active thread where the new language is selected).

Additionally, as will be evident from the above discussion of FIGS. 5 and 6, the input language for each application program open on the computer system and/or threads within an application program may be individually set and different from the other application programs and/or threads open on the computer system. For example, in the examples illustrated in FIGS. 5 and 6, input for Application Program 2 may be set to a third language (e.g., Spanish) and input for Application Program 3 may be in yet another language (e.g., German). Any combination of different languages can be used over the open application programs and threads without departing from this invention.

Furthermore, if desired, a user can easily switch between the various available application programs and/or open threads therein (e.g., using the application toolbar 502). When switching in this manner, the input panel 516 or 534 for the associated input language for that application and/or thread (as well as the handwriting and/or speech recognizers, in at least some examples) will be set to the input language and made available to the user. Additionally, the input language across the soft keyboard, writing pad, handwriting recognizer, and/or speech recognizer may change at any suitable time, e.g., based on when the language for a thread changes, when a new window is activated, when a window in another application program is activated, or any other suitable time, depending on the set up of the system. All input settings for the keyboard, writing pad, handwriting recognizer, and/or speech recognizer may be set, if desired, on a per user, per document, and/or per thread basis, or in any other desired manner. In at least some examples of the invention, different users on the system can have different user interface surfaces available in a given application program and/or thread.

When an input panel is activated in a given thread or application, the operating system looks at the keyboard layout identifier for the selected or set language in the thread or application and provides a mechanism for converting between the keyboard scan code number (which is based upon the physical position of a key on the keyboard) and the character that will be generated as input when that key is activated. Using this mechanism, a fixed software keyboard is morphed into a language-specific software keyboard by setting the key labels appropriately. For example, the scan code for the letter "Q" on an English QWERTY keyboard is 16. Accordingly, when a user selects English as the input language and the software system queries the system for the appropriate key label for scan code 16, the system returns the answer "Q." The software keyboard then displays the letter "Q" as the label on that key. When the input language is changed to French, the same query for scan code 16 will result in the answer "A," and the software keyboard will then display the letter "A" at the proper position. By this method, a single, fixed software keyboard (fixed in terms of scan codes) may be morphed into any input language that the user selects.

Many keyboard layouts include a special modifier key called "Alt-Graphic" or "Alt-Gr" (akin to simultaneously pressing "Ctrl" and "Alt" on a physical U.S. keyboard). Software keyboards produced in at least some examples of this invention use a scan code layout that includes the Alt-Gr key for those languages and keyboard layouts that require it.

As described above, the soft keyboard layout rendered on the computer display is set based on keyboard layout identifiers for the language of interest. Such layout identifiers are known and conventionally used. While most differing keyboard layouts have different keyboard layout identifiers (e.g., the QWERTY and DVORAK keyboards commonly used in the U.S. have different layout identifiers), this is not always the case. For example, two common keyboard layouts used in Japan (the Japanese "101" keyboard and the Japanese "106" keyboard) share a single layout identifier. While similar, these two keyboard layouts have some significant differences. For example, one layout has five additional keys not present in the other layout, and some of the common keys are located in different positions within their respective layout.

Systems and methods according to examples of the present invention can handle this situation in any suitable manner without departing from the invention. For example, the systems and methods could simply request that the user specifically enter the desired keyboard layout, optionally, after displaying or otherwise describing the various available layout options.

As another example, when this situation occurs (e.g., when a language is selected in which the associated keyboard identifier has two or more possible layouts), systems and methods according to at least some examples of the invention may render a soft keyboard layout based on a physical keyboard driver that previously had been used in connection with that computer. In other words, if the computer on which the language selection had been made previously was operated with a physical keyboard corresponding to one of the two or more possible layouts, a soft keyboard layout corresponding to the previously activated physical keyboard and/or physical keyboard driver will be rendered on the screen. Optionally, a soft keyboard layout corresponding to the most recently used or most often used physical keyboard and/or keyboard driver may be rendered in this situation. In this manner, systems and methods according to at least some examples of this invention can keep current with instances where the user's machine changes its hardware configuration and provide a soft keyboard that corresponds with recently used physical keyboards.

Figure 7:
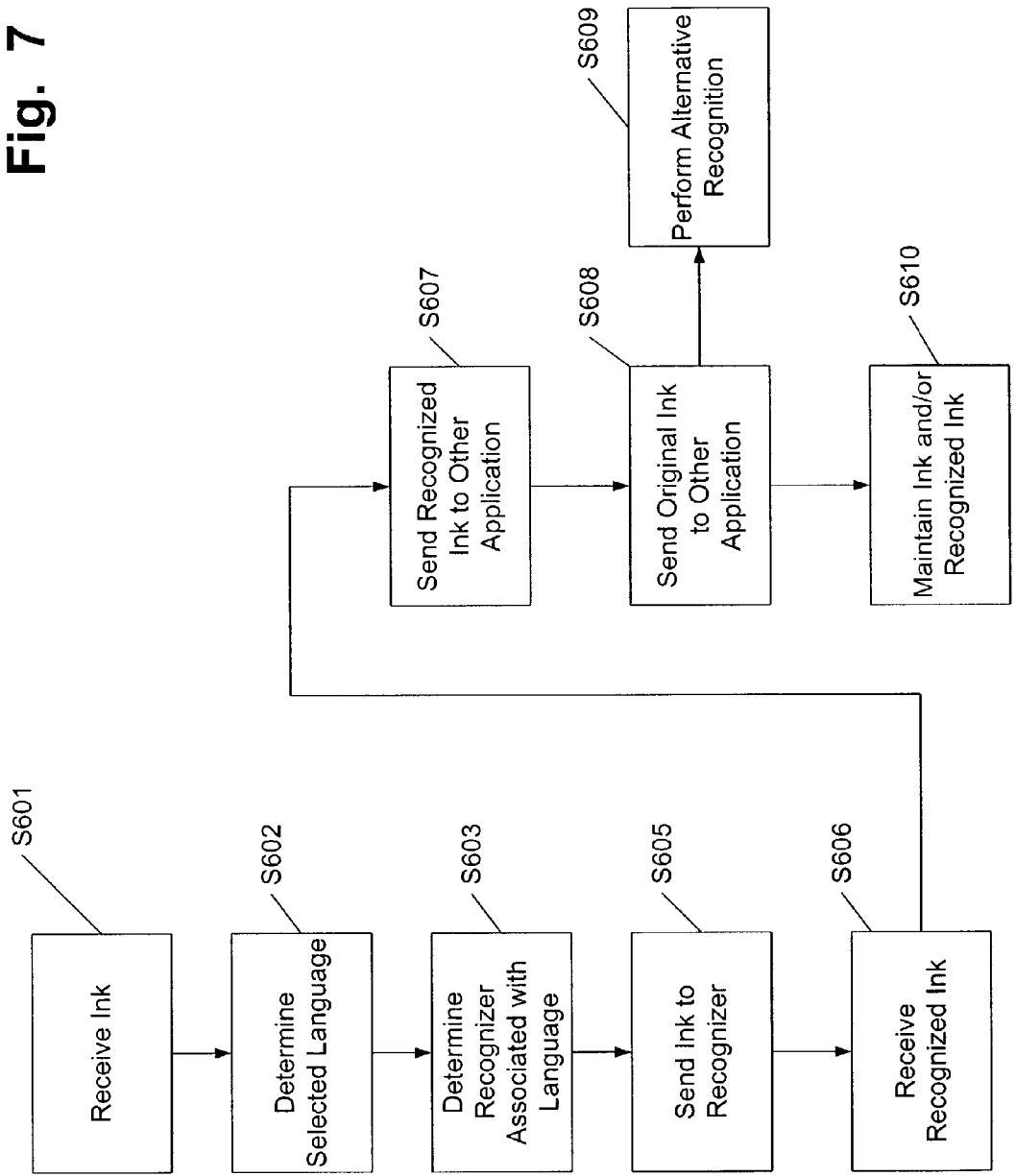
FIGS. 7 and 8 illustrates example methods for setting an input language and/or a handwriting recognizer in accordance with at least some examples of this invention.

FIG. 7 relates to additional methods that may be used in connection with at least some examples of this invention, particularly, examples of the invention in which at least some of the incoming input data is in the form of electronic ink input (e.g., using a pen or stylus-based PC, as illustrated in FIG. 2). As a first step in this example process, electronic ink is received as input (S601). Then, one example of systems and/or methods according to this aspect of the invention determine a selected input language for the application program in which the ink input is received (S602). This input language may be, for example, the input language also associated with a soft keyboard that would be generated for use in the application program accepting the ink input. Once the selected input language is ascertained, the handwriting recognizer associated with this selected language is determined (S603).

At least some of the electronic ink input is then sent to the handwriting recognizer (S605). Once the recognition step is completed, the recognized ink (e.g., as machine-generated text) may be returned to the original application program (S606). Additionally (or as another option), the recognized ink may be sent to another application program (S607). Likewise, the original ink input may be sent to another application program (S608), for example, to another, alternative handwriting recognizer program (S609), if desired (e.g., sending a portion of the handwriting to a recognizer for another language). The original and/or the recognized ink may be maintained in the original application program in which the ink was entered and/or in one or more other application programs (S610).

Of course, the steps in the example procedures described in connection with FIG. 7 may vary widely, in both order and content, without departing from this invention. For example, one or more of Steps S606-S610 may be eliminated and/or changed in order without departing from the invention. As another example, one or more applications programs (including the application program originally receiving the electronic ink input) may maintain either one or both of the recognized ink (machine-generated text) or the original electronic ink without departing from the invention. Other variations in and combinations of these example procedures also are possible without departing from the invention.

Figure 8:
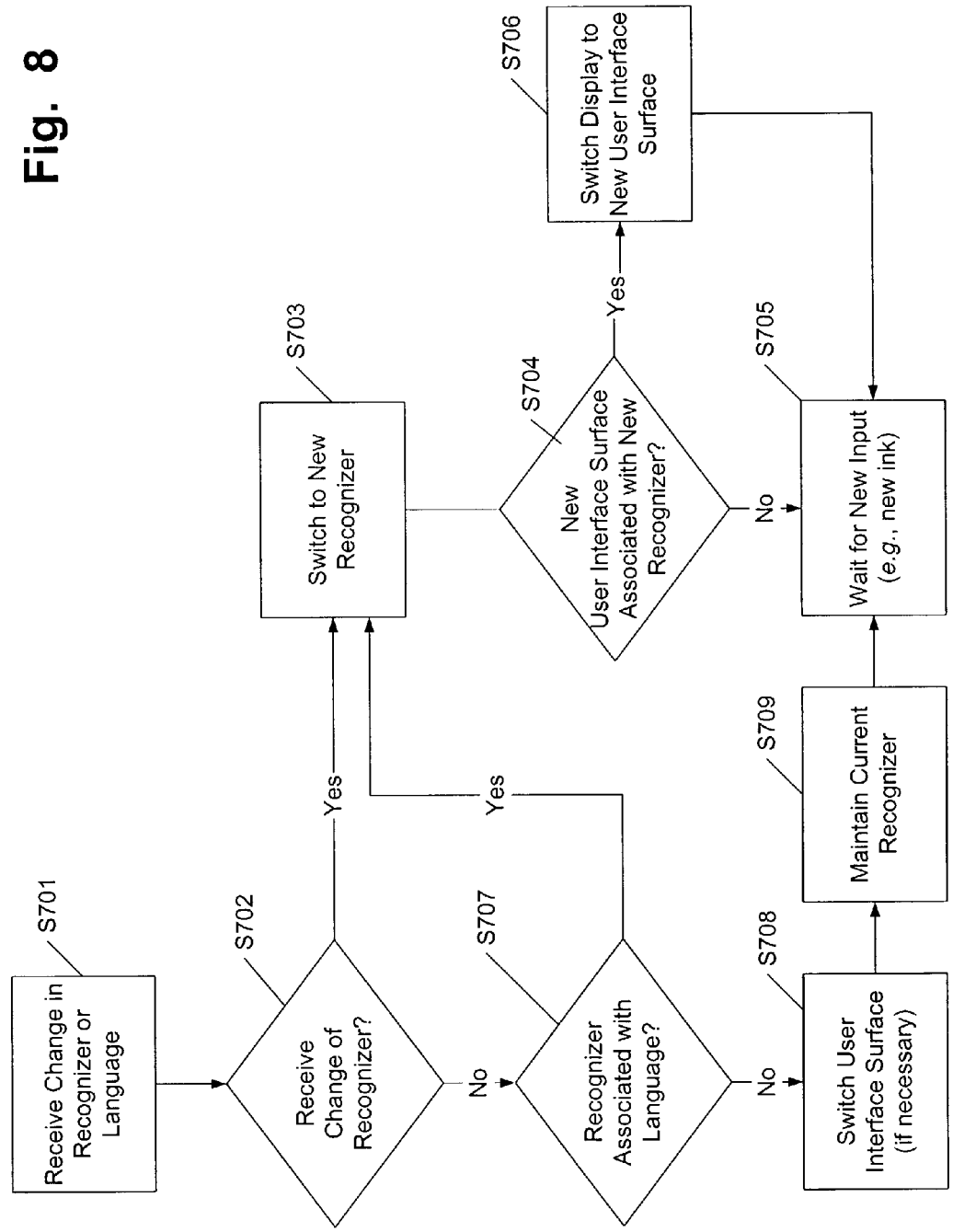

FIG. 8 illustrates additional examples of methods useful in practicing at least some examples of this invention. In the example process illustrated in FIG. 8, in a first step, a change of handwriting recognizer and/or input language for an application program (or thread within an application program) is/are received (S701). Systems and methods according to this example of the invention next determine whether the change was a change in recognizer associated with the application program (S702). If yes, the system switches to the new recognizer for this application program or thread (S703).

Then, the system determines whether there is a new handwriting input area user interface surface and/or ink collection area user interface surface and/or handwriting recognizer user interface surface associated with the new handwriting recognizer and/or language input (S704). If No (S705), the system simply waits for new input. If Yes, the new handwriting input area and/or ink collection area and/or recognizer user interface surface may be displayed (at an appropriate time) (S706), and then the system will wait for new input (S705).

If the change at S702 is not a recognizer change (Answer "No"), by default it must be an input language change. Accordingly, at S707, systems and methods according to this example of the invention determine whether a new handwriting recognizer is associated with the newly selected input language. If Yes, the procedure moves to S703 in which the systems and methods switch to the new recognizer for this application program or thread and proceeds through Steps S704-706, as described above.

If no new recognizer is associated with the language change (Answer "No" at S707), systems and methods according to at least some examples of the invention still may change to a new handwriting input area user interface surface and/or ink collection area user interface surface that corresponds to the newly selected language (S708), while maintaining the current recognizer (S709), because no recognizer is associated with the newly selected language. Of course, any suitable way of handling this situation can be used without departing from the invention, as generally discussed above in connection with S320 in FIG. 3. The systems and methods then await new input (S705).

Of course, the various specific steps and procedures described above in conjunction with FIG. 8 exemplify certain specific examples of the invention. Variations in the steps may be made without departing from the spirit and scope of the invention.

In some examples, systems and methods according to this invention may have the ability to make only one handwriting, speech, and/or soft keyboard input tab/user interface surface available for input at a time and/or in a given document and/or thread. Each recognizer may have an associated tab/user interface surface that is visible as a top-level input user interface. In some systems and methods, only one recognizer/writing pad may be available to a user at a time, depending on the system input setting and/or default settings picked during system set up. In some systems and methods, only one recognizer (speech and/or handwriting) may be allowed to be active at a given time. As another alternative, availability and use of multiple user interface surfaces/tabs, one for each language in use by the user, may be provided.

If desired, for handwriting and speech, any words that are added to a dictionary by the user may be preserved across all languages in which the user works. As such, handwriting and speech recognition alternatives for input may look in the dictionary across the various languages.

E. Conclusion

Various examples of the present invention have been described above, and it will be understood by those of ordinary skill that the present invention includes within its scope all combinations and subcombinations of these examples. For example, although not specifically described above, different portions of an individual thread (such as different portions of an individual document) may be assigned different input languages, if desired. This may be accomplished in any suitable manner without departing from the invention, such as by block selecting certain input and assigning an new input language to it, by adding code in a document indicating an input language change, and the like.

Additionally, those skilled in the art will recognize that the above examples simply exemplify various aspects of the invention. Various changes and modifications may be made without departing from the spirit and scope of the invention, as defined in the appended claims.

We claim:

1. A method for rendering a soft keyboard, comprising:
   determining a first input language associated with a first application program accepting input through a computer;
   rendering a soft keyboard on a display of the computer, wherein the soft keyboard is configured based, at least in part, on the first input language;
   switching from the first application program to a second application program that is different from the first application program, in response to input from a user;
   determining a second input language associated with the second application program; and
   when the second input language differs from the first input language, automatically rendering a new soft keyboard on the display of the computer, wherein the new soft keyboard is configured based, at least in part, on the second input language,
   wherein the first and second input languages have been previously associated with the first and second application programs, respectively, based on input languages selected by the user,
   wherein the soft keyboard rendered on the display is configured based, at least in part, on a physical keyboard driver previously used on the computer for the determined input language.

2. A method for rendering a soft keyboard, comprising:
   determining a first input language associated with a first application program accepting input through a computer;
   rendering a soft keyboard on a display of the computer, wherein the soft keyboard is configured based, at least in part, on the first input language;
   switching from the first application program to a second application program that is different from the first application program, in response to input from a user;
   determining a second input language associated with the second application program;
   when the second input language differs from the first input language, automatically rendering a new soft keyboard on the display of the computer, wherein the new soft keyboard is configured based, at least in part, on the second input language,
   wherein the first and second input languages have been previously associated with the first and second application programs, respectively, based on input languages selected by the user; and
   selecting a speech recognizer based, at least in part, on the input language determined for the first application program.

3. A soft keyboard system, comprising:
   an input for selecting a first input language for a first application program accepting input through a computer, wherein the first input language is associated with the first application program in response to the input;
   a processor for rendering a soft keyboard on a display of the computer, wherein the soft keyboard is configured based, at least in part, on the first input language;
   a selector for switching from the first application program to a second application program that is different from the first application program; and
   an input for selecting a second input language for the second application program, wherein the second input language is associated with the second application program in response to the input, and wherein when the second input language differs from the first input language, the processor renders a new soft keyboard on the display of the computer, wherein the new soft keyboard is configured based, at least in part, on the second input language, wherein the soft keyboard rendered on the display is configured based, at least in part, on a physical keyboard driver previously used on the computer for the selected input language.

4. A soft keyboard system, comprising:
an input for selecting a first input language for a first application program accepting input through a computer, wherein the first input language is associated with the first application program in response to the input;
a processor for rendering a soft keyboard on a display of the computer, wherein the soft keyboard is configured based, at least in part, on the first input language;
a selector for switching from the first application program to a second application program that is different from the first application program; and
an input for selecting a second input language for the second application program, wherein the second input language is associated with the second application program in response to the input, and wherein when the second input language differs from the first input language, the processor renders a new soft keyboard on the display of the computer, wherein the new soft keyboard is configured based, at least in part, on the second input language,
wherein a speech recognizer for at least some of the input is selected based, at least in part, on the first input language.

5. A computer-readable memory having stored thereon computer-executable instructions for performing a method comprising:
determining a first input language associated with a first application program accepting input through a computer;
rendering a soft keyboard on a display of the computer, wherein the soft keyboard is configured based, at least in part, on the first input language;
switching from the first application program to a second application program that is different from the first application program;
determining a second input language associated with the second application program; and when the second input language differs from the first input language, automatically rendering a new soft keyboard on the display of the computer, wherein the new soft keyboard is configured based, at least in part, on the second input language, wherein the first and second input languages have been previously associated with the first and second application programs, respectively, based on input languages selected by the user,
wherein the soft keyboard rendered on the display is configured based, at least in part, on a physical keyboard driver previously used on the computer for the determined input language.

6. A computer-readable memory having stored thereon computer-executable instructions for performing a method comprising:
determining a first input language associated with a first application program accepting input through a computer;
rendering a soft keyboard on a display of the computer, wherein the soft keyboard is configured based, at least in part, on the first input language;
switching from the first application program to a second application program that is different from the first application program;
determining a second input language associated with the second application program; when the second input language differs from the first input language, automatically rendering a new soft keyboard on the display of the computer, wherein the new soft keyboard is configured based, at least in part, on the second input language, wherein the first and second input languages have been previously associated with the first and second application programs, respectively, based on input languages selected by the user; and
setting a speech recognizer based, at least in part, on the first input language.

7. A process of changing between at least two recognizers, comprising:
receiving a change in language;
determining if a change in recognizer is associated with the change in language;
switching from a first recognizer to a second recognizer when the second recognizer corresponds to the language of the change and the first recognizer does not correspond to the language of the change;
upon determining that no recognizer is associated with the language of the change, switching a language displayed in a graphical user interface to the language of the change and maintaining the first recognizer.

8. A method for rendering a soft keyboard in a language associated with a currently selected application program thread using the soft keyboard for input, comprising:
identifying a current input language associated with a currently selected application program thread;
rendering a soft keyboard on a display of the computer, wherein the soft keyboard is configured based, at least in part, on the current input language associated with the currently selected application program thread;
changing the selected application program thread to a newly selected application program thread; and
identifying an new input language associated with the newly selected application program thread and maintaining the displayed soft keyboard when the new input language is the same as the current input language, wherein when the new input language is different than the current input language,
identifying a keyboard identifier associated with the new input language;
determining a keyboard layout associated with the keyboard identifier, wherein when multiple keyboard layouts are associated with the keyboard identifier, the keyboard layout is determined to be the keyboard layout corresponding to a physical keyboard driver either most commonly used or most recently used by the computer for inputting the new input language; and
rendering a soft keyboard on a display of the computer based on the determined keyboard layout corresponding to the new input language;
wherein the current and new input languages have been previously associated with the currently selected application program thread and the newly selected application program thread, respectively, based on input languages selected by the user, and wherein the method is repeated for subsequent changes of a selected application program thread.

9. The method according to claim 8, wherein said first and second application program threads are associated, respectively, with first and second application programs which are different from each other.

10. The method according to claim 9, further comprising:
    determining whether the new input language matches the language of an available handwriting or speech recognizer;
    setting a selected recognizer as the recognizer associated with the new input language, if a matching recognizer is determined to be available; and
    maintaining a current recognizer if no matching recognizer is determined to be available.

* * * * *